US011858852B2

(12) United States Patent
Kupwade-Patil et al.

(10) Patent No.: US 11,858,852 B2
(45) Date of Patent: Jan. 2, 2024

(54) SYSTEMS AND METHODS FOR PRODUCING A THREE-DIMENSIONAL PRINTABLE MATERIAL FROM IGNEOUS ANORTHOSITE ROCK

(71) Applicant: Icon Technology, Inc., Austin, TX (US)

(72) Inventors: Kunal Kupwade-Patil, Austin, TX (US); Michael McDaniel, Austin, TX (US); Thao Hien Nguyen, Austin, TX (US); Theodore Cera, Austin, TX (US); Alexander Le Roux, Austin, TX (US); Jason Ballard, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 9 days.

(21) Appl. No.: 17/556,865

(22) Filed: Dec. 20, 2021

(65) Prior Publication Data
US 2022/0242794 A1 Aug. 4, 2022

Related U.S. Application Data

(60) Provisional application No. 63/144,231, filed on Feb. 1, 2021.

(51) Int. Cl.
*C04B 35/195* (2006.01)
*C04B 35/653* (2006.01)
(Continued)

(52) U.S. Cl.
CPC ............ *C04B 35/195* (2013.01); *B28B 1/001* (2013.01); *B33Y 10/00* (2014.12); *B33Y 40/00* (2014.12);
(Continued)

(58) Field of Classification Search
CPC ......... B28B 1/001; B28B 1/54; C04B 35/195; C04B 35/653; C04B 2235/3481;
(Continued)

(56) References Cited

U.S. PATENT DOCUMENTS 3,507,629 A * 4/1970 Leitch ................. C22B 21/0015
23/302 R
4,810,442 A * 3/1989 Hillig ...................... B28B 19/00
264/642
(Continued)

FOREIGN PATENT DOCUMENTS

CN 108033804 A * 5/2018
CN 109679600 A * 4/2019 ........... C04B 14/062
(Continued)

OTHER PUBLICATIONS

ASTM International (ASTM C373-18, "Standard Test Methods for Determination of Water Absorption and Associated Properties by Vacuum Method for Pressed Ceramic Tiles and Glass Tiles and Boil Method for Extruded Ceramic Tiles and Non-tile Fired Ceramic Whiteware Products", Feb. 1, 2018) (Year: 2018).*
(Continued)

*Primary Examiner* — Timothy Kennedy
*Assistant Examiner* — Ariella Machness
(74) *Attorney, Agent, or Firm* — KOKKA & BACKUS, PC

(57) ABSTRACT

Systems and methods for preparing a three-dimensional printing material derived from aluminosilicate material are provided. The method includes the steps of heating an amount of aluminosilicate powder to a temperature between approximately 1,100° C. and approximately 1,750° C. to form a molten aluminosilicate material; maintaining the
(Continued)

molten aluminosilicate material at a temperature between approximately 1,100° C. and approximately 1,750° C. between about one minute and approximately 45 minutes; extruding molten aluminosilicate material through a nozzle to form an elongated bead of molten aluminosilicate material; and cooling the molten aluminosilicate material to form a hardened aluminosilicate material. Once hardened, the aluminosilicate material includes between about 50% and 90% feldspar and demonstrates a strength of between about 5,000 psi and 30,000 psi. The systems and methods enable the construction of structures using raw, in-situ natural resources without the need for additives to adjust or modify the viscosity of the molten material prior to extrusion or printing.

13 Claims, 5 Drawing Sheets

(51) Int. Cl.
  *B33Y 10/00*   (2015.01)
  *B28B 1/00*    (2006.01)
  *B33Y 40/00*   (2020.01)

(52) U.S. Cl.
  CPC .... *C04B 35/653* (2013.01); *C04B 2235/3481* (2013.01); *C04B 2235/442* (2013.01); *C04B 2235/6021* (2013.01); *C04B 2235/6026* (2013.01)

(58) Field of Classification Search
  CPC . C04B 2111/00129; C04B 2111/00181; C04B 2235/6021; C03B 19/025; C03B 37/02
  See application file for complete search history.

(56) References Cited

U.S. PATENT DOCUMENTS

| | | | |
|---|---|---|---|
| 6,156,683 A * | 12/2000 | Grove-Rasmussen | C03C 13/00 501/36 |
| 6,547,550 B1 * | 4/2003 | Guenther | B28B 3/24 419/60 |
| 2010/0273630 A1 * | 10/2010 | Guenther | C04B 33/326 501/154 |
| 2017/0291841 A1 * | 10/2017 | Inamura | B33Y 30/00 |
| 2018/0311892 A1 | 11/2018 | Abbott, Jr. et al. | |
| 2019/0200447 A1 | 6/2019 | Choi et al. | |

FOREIGN PATENT DOCUMENTS

| | | |
|---|---|---|
| DE | 102016100513 A1 * | 7/2017 |
| WO | 2020099484 | 5/2020 |

OTHER PUBLICATIONS

International Search Report and Written Opinion issued to PCT/US2021/064443 dated Mar. 9, 2022, 13 pages.

Boyle et al., "3D Printing using powder melt extrusion" Addit Manuf. 2019; 29:100811. doi:10.1016/j.addma.2019.100811; Abstract; p. 3 para 3; p. 4 para 1.2; p. 6 para 2.

* cited by examiner

SYSTEMS AND METHODS FOR PRODUCING A THREE-DIMENSIONAL PRINTABLE MATERIAL FROM IGNEOUS ANORTHOSITE ROCK

CROSS-REFERENCE TO PRIOR FILED APPLICATIONS

This application incorporates by reference and claims the benefit of priority to U.S. Provisional Application No. 63/144,231, filed on Feb. 1, 2021.

BACKGROUND

This disclosure is generally directed to three-dimensional (3D) printing of building structures. More particular, this disclosure is directed to systems and methods for producing a printable material from igneous anorthosite rock for use with a 3D printing system.

Cement and other forms of concrete have played an integral role in the construction of any large scale buildings. In a typical use case, cement is initially mixed off-site (e.g., away from the construction project) and then transported via truck or other means to the construction site. Alternatively, cement may be mixed on-site and pumped up to a desired floor for delivery. Once at the site, the truck delivers, or pours, cement at a desired location. From there, skilled laborers smooth and shape the cement, and allow it to set or harden.

Three dimensional (3D) printing of cement uses specialized equipment to deposit a cement layer at a specific location using a degree of precision, oftentimes on top of a previously deposited cement layer. 3D printing of cementitious ink allows for easy addition of components to and variation within the deposition, within the layering as well as the shaping of the layering, allowing for the use of processes that would be difficult to implement in a conventional construction process. For example, 3D printing allows for the introduction of complex variabilities within the layering. 3D printing also allows for producing structures with complex geometrical shapes.

While cement is commonly used in the construction of a wall or foundational structure, sourcing cement materials for large-scale projects can become costly, particularly if the materials are not readily available locally. The use of cement is also correlated with high emissions of greenhouse gases and other pollutants.

Accordingly, a need exists for systems and methods of developing a 3D printable material for use in the construction of structurally sound buildings and that is derived from natural resources comprising aluminosilicate such as igneous anorthosite rock material.

SUMMARY

To meet the needs noted above and others, the present disclosure provides systems and methods for facilitating in-situ resource utilization and processing of igneous anorthosite rock to form 3D printable material. Raw, in situ material comprising igneous anorthosite rock is processed in order to create material suitable for use by 3D printing technology.

In one example embodiment, a rock processing system for processing igneous anorthosite rock material to form 3D printable material includes a hopper that directs the rock material into a feeding tube and into an electric reactor assembly, utilizing an auger to move the rock material through the feeding tube. The rock material is heated and transitioned to a molten state in the electric reactor assembly, forming the 3D printable material. The 3D printable material is then extruded from the reactor assembly through a high temperature nozzle assembly.

To process the igneous anorthosite rock, the igneous anorthosite rock is first ground into a powder material of aluminosilicate using a conventional rock crushing machine or the like. The powder rock material is then directed into the hopper of the rock processing system and moved through the feeding tube by the auger into the electric reactor assembly, where the powder rock material is gradually heated to a melting temperature of between approximately 1,100° C. and approximately 1,750° C., preferably at least approximately 1,150° C., within the reactor assembly. It is then held at the melting temperature in the reactor assembly for a duration of between at least about one minute and up to about 45 minutes. The molten printable material is then extruded through the high temperature nozzle assembly. The melting temperature and the duration at which the material is held at its melting temperature may vary based on the type of raw material being processed.

In the illustrated embodiment, igneous anorthosite rock material, composed primarily of plagioclase feldspar, is gathered, collected, or otherwise obtained in its natural state. The presently disclosed systems and methods may also be used to develop other rock material, including, but not limited to, other aluminosilicates, sand, clays, shale, soil, metakaolin, kaolinite, metamorphic rocks, fly ash, and volcanic ash, into 3D printable material.

The rock processing system described herein may be mounted within a robotic motion platform, a gantry, or another suitable support structure that moves the system repeatedly along a desired path to form a structure. Specifically, the support structure moves the system along an x, y-plane in order to deposit an elongated bead, layer by layer and vertically upward to form a wall. Using the support structure, the printable rock material formation system may be moved along a desired path repeatedly to form a wall structure or the like. In light of the disclosure herein, and without limiting the scope of the invention in any way, in a first aspect of the present disclosure, which may be combined with any other aspect listed herein unless specified otherwise, a 3D printable material derived from aluminosilicate powder is provided. The method for preparing a three-dimensional printing material includes: heating an amount of aluminosilicate powder within an electric reactor assembly to a temperature between approximately 1,100° C. and approximately 1,750° C. to form a molten aluminosilicate material; maintaining the aluminosilicate material at a temperature between approximately 1,100° C. and approximately 1,750° C. for a minimum of about 45 minutes; and extruding molten aluminosilicate material from the electric reactor assembly.

In a second aspect of the present disclosure, which may be combined with any other aspect listed herein unless specified otherwise, the aluminosilicate powder comprises a feldspar.

In a third aspect of the present disclosure, which may be combined with any other aspect listed herein unless specified otherwise, the aluminosilicate powder comprises an igneous anorthosite rock material.

In a fourth aspect of the present disclosure, which may be combined with any other aspect listed herein unless specified otherwise, no further materials are added to the aluminosilicate powder or the molten aluminosilicate material prior to extrusion.

In a fifth aspect of the present disclosure, which may be combined with any other aspect listed herein unless specified otherwise, the method further includes the step of allowing the molten aluminosilicate material to harden for at least 7.5 minutes.

In a sixth aspect of the present disclosure, which may be combined with any other aspect listed herein unless specified otherwise, the hardened aluminosilicate material includes approximately between about 50% and about 90% feldspar.

In a seventh aspect of the present disclosure, which may be combined with any other aspect listed herein unless specified otherwise, the hardened aluminosilicate material includes approximately 2.4% calcite.

In an eighth aspect of the present disclosure, which may be combined with any other aspect listed herein unless specified otherwise, the hardened aluminosilicate material has a compressive strength of between about 5,000 psi and about 30,000 psi.

In a ninth aspect of the present disclosure, which may be combined with any other aspect listed herein unless specified otherwise, the method further includes the step of extruding molten aluminosilicate material from the electric reactor assembly to form a plurality of elongated beads stacked atop one another to form a structure. For example, In a tenth aspect of the present disclosure, which may be combined with any other aspect listed herein unless specified otherwise, a method for preparing a three-dimensional printing material includes the step of providing a system including a hopper; a tubular member; an auger powered by an auger motor; and an electric reactor assembly. The method further comprises the steps of: placing an amount of aluminosilicate powder into the hopper; directing the aluminosilicate powder through the tubular member and into the electric reactor assembly via the auger; heating the aluminosilicate powder to a temperature between approximately 1,100° C. and approximately 1,750° C. to form a molten aluminosilicate material; maintaining the molten aluminosilicate material at the temperature between approximately 1,100° C. and approximately 1,750° C. for a minimum of approximately 45 minutes; and extruding the molten aluminosilicate material from the system.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Certain embodiments described herein relate generally to the field of processing igneous anorthosite rock to form 3D printable material. The systems and methods enable the construction of structures using raw, in-situ natural resources without the need for additives to adjust or modify the viscosity of the molten material prior to extrusion or printing. Additionally, the printable material described herein differs from traditional cementitious ink in that the printable material derived from igneous anorthosite rock that is readily available in certain locations.

The present application is directed toward the in-situ use of aluminosilicate materials in 3D printing. Extrusion involves creating a viscous fluid that is pumped through a nozzle to print beads of material in layers that harden after deposition. Extrusion of concrete is the predominant approach to 3D printing for construction, although foams and other polymers have also been used. In contrast, the presently disclosed 3D printable material is derived from igneous anorthosite rock that is readily available in certain locations or areas. In one embodiment, the igneous anorthosite rock predominantly comprises plagioclase feldspar.

Figure 1:
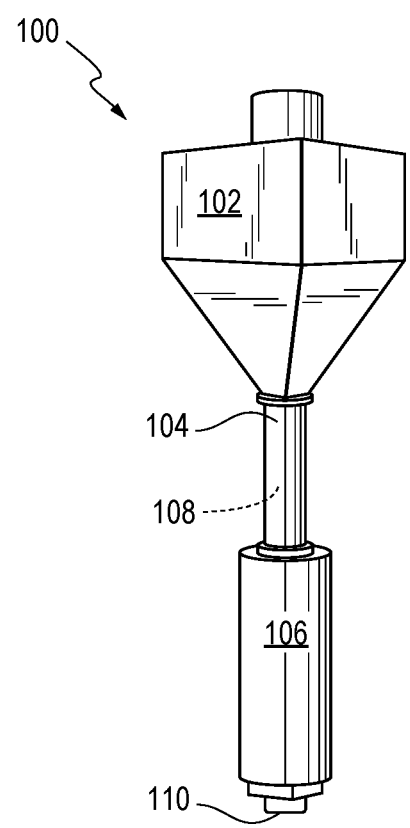
FIG. 1 illustrates a diagram of a first embodiment of a system for producing a 3D printable material from igneous anorthosite rock, according to an example embodiment of the present disclosure.

FIG. 1 illustrates an exemplary rock processing system 100 for preparing printable material derived from an aluminosilicate material such as igneous anorthosite rock. The rock processing system 100 includes a hopper 102 secured to a feeding tube 104 that directs material into an electric reactor assembly 106. An auger 108 directs the material through the feeding tube 104, and the material is extruded from the furnace assembly 106 through a high temperature nozzle assembly 110. The hopper 102, the feeding tube 104, the auger 108, and the nozzle assembly 110 can be any commercially available products. The electric reactor assembly 106 may operate through electric induction means, multiple electric resistive-based designs, or any other suitable design.

Figure 2:
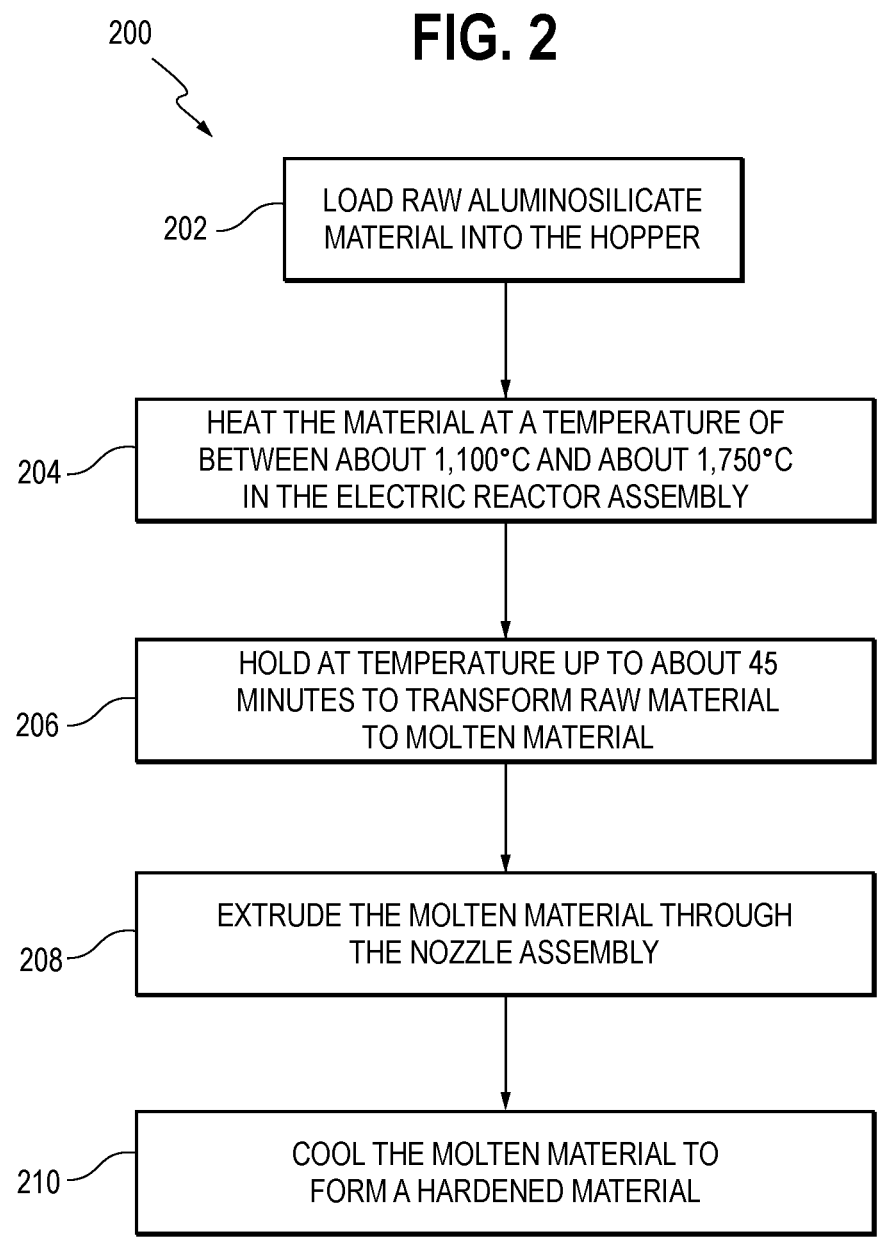
FIG. 2 is a flow diagram of a method for producing 3D printable material using the system of FIG. 1.

FIG. 2 outlines an exemplary method 200 for developing the printable material using the rock processing system 100. In a first step 202, an aluminosilicate powder material is fed into the hopper 102 and moves through the feeding tube 104 by means of the auger 108 into the electric reactor assembly 106. In one embodiment, the aluminosilicate powder is derived from igneous anorthosite rock. The natural aluminosilicate predominantly consists of Labradorite, a feldspar mineral. The powder may be passed through a sieve to remove larger pieces before entering the hopper.

The aluminosilicate material is heated to a melting temperature in the reactor assembly 106 in step 204 during which the material melts from a solid to a molten state. The aluminosilicate powder is heated gradually to a temperature between approximately 1,100° C. and approximately 1,750° C., preferably at least approximately 1,150° C., to form a molten aluminosilicate material. In other embodiments, the aluminosilicate material may be derived from another rock source and the temperature range is adjusted to the melting temperature of the rock source. In a preferred embodiment, no additives are used to adjust or modify the viscosity of the liquid state before the molten mixture reaches the nozzle 110.

In step 206, the molten aluminosilicate material is maintained at the melting temperature within the reactor assembly 106 for a period of time in order to allow for phase changes and to reach the viscosity needed for extrusion. In one embodiment, maintaining the temperature for between about at least one minute and up to about 45 minutes, preferably at least approximately 45 minutes, allows the molten aluminosilicate material to form crystalline and amorphous phases and reach a suitable viscosity. In other embodiments, the temperature may be maintained for more than 45 minutes. When the aluminosilicate material is derived from another rock source, the duration of time at which the molten material is held at its melting temperature may vary to reach the desired crystalline structure and viscosity.

In step 108, the molten aluminosilicate material is extruded through the high temperature nozzle assembly 110, and the printed aluminosilicate material hardens after about 15 minutes under normal conditions. In one embodiment, the molten material cools to the hardened state at a rate of about 300 degrees Celsius for the first two minutes and then the cooling rate decreases. The initial set time is around 30 seconds. The hardening step may take longer or shorter, depending on the conditions of the environment under which the printable material is extruded.

Figure 3:
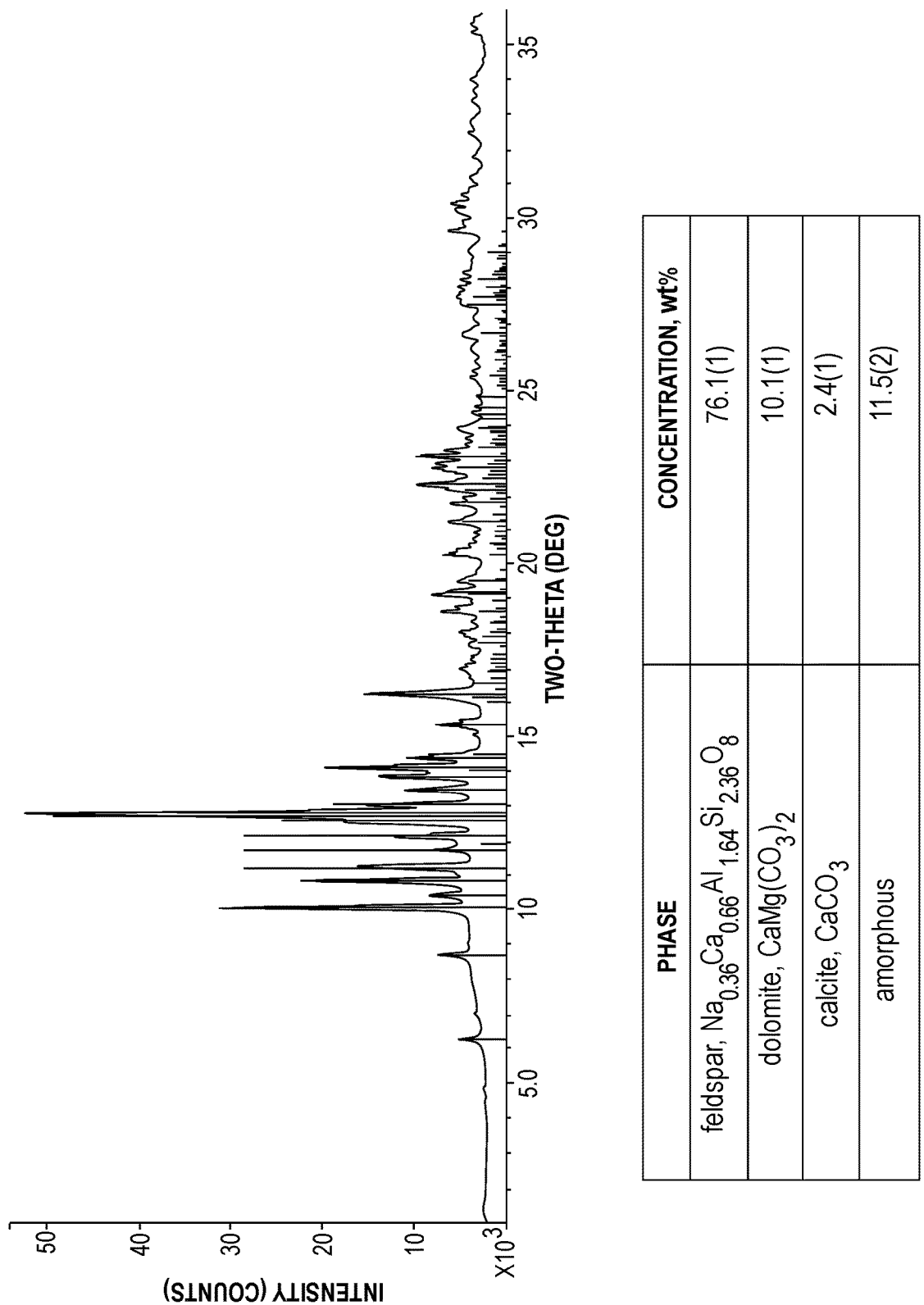
FIG. 3 is a graph demonstrating x-ray diffraction analysis of a hardened sample of the printable material according to the present application.

FIG. 3 provides the phases of the crystalline structure of a hardened sample of aluminosilicate material after it was melted at 1,300° C. The 3D printable material contains about 11.5% amorphous phase (having no clear structure). The crystalline phase includes of 76.1% of albite/anorthosite feldspar, 10.1% dolomite, and 2.4% calcite. The strength of the hardened material is provided by the crystalline phase, primarily the feldspar. In one embodiment, the crystalline structure of a hardened sample of aluminosilicate material includes between about 50 and 90% albite/anorthosite feldspar.

Density of the cooled material was measured using a pycnometer. One set of samples provided densities ranging between about 1.916 g/cm$^3$ to about 2.3 g/cm$^3$.

Figure 4:
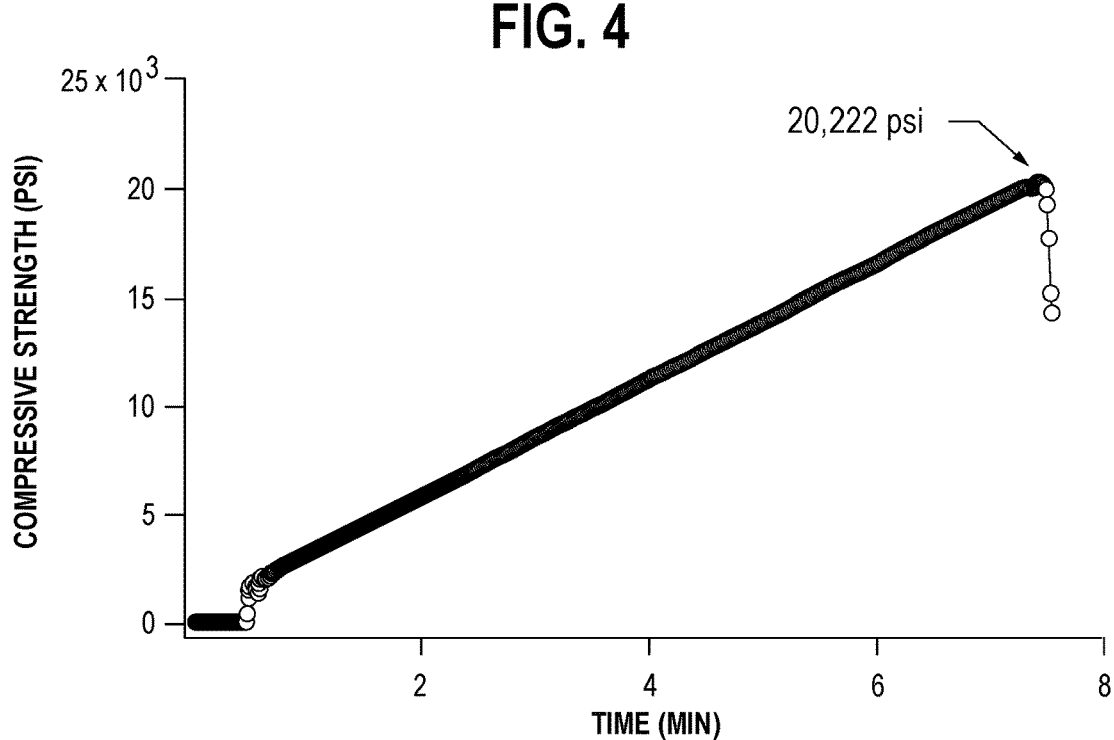
FIG. 4 is a graph demonstrating compressive strength over time of the printable material according to the present application.

Referring to FIG. 4, the hardened sample demonstrates a compressive strength of 20,222 psi after about 7.5 minutes. In a preferred embodiment, hardened aluminosilicate material has a compressive strength between about 5,000 psi to about 30,000 psi due to the generation of crystalline phases during the period of time that the material is held at its melting temperature. Specifically, the albite/anorthosite feldspar generated during this period and the calcite contribute to the increased strength.

Figure 5:
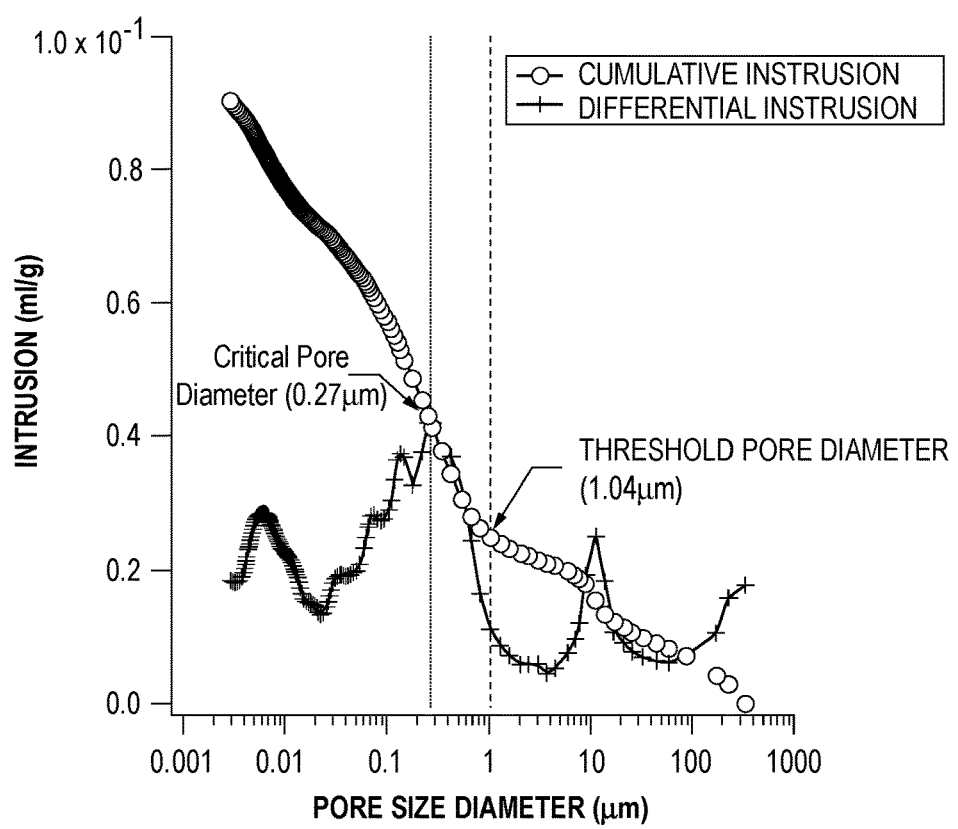
FIG. 5 is a graph demonstrating the pore structure analysis of the printable material according to the present application.

The porosity of a hardened sample of the printed material was determined using mercury intrusion porosimetry. As shown in FIG. 5, the hardened sample has a porosity of 14.84% with a threshold pore diameter of 1.04 μm and a critical pore diameter of 0.27 μm. In a preferred embodiment, the hardened aluminosilicate material has a porosity between about 10% and about 20%. Threshold pore diameters are defined as the largest pore diameter at which significant intruded mercury pore volume is detected were calculated to be the pore size at the first inflection point. These dimensions are comparable to a normal concrete system. The enhanced strength can therefore be attributed to the formation of the albite/anorthosite feldspar generated during the period at which the material is held at its melting temperature.

In some embodiments, the rock processing system 100 for developing 3D printable material from aluminosilicate material is mounted within a robotic motion platform. In other embodiments, the rock processing system 100 is incorporated into a large scale gantry used by the construction system to place the high temperature nozzle assembly 110 of the rock processing system 100 at the appropriate x, y and z axis positions. Other gantry designs, rolling towers, robotic arms on mobile bases, and other systems may also be used to deposit the 3D printable material described herein.

Figure 6:
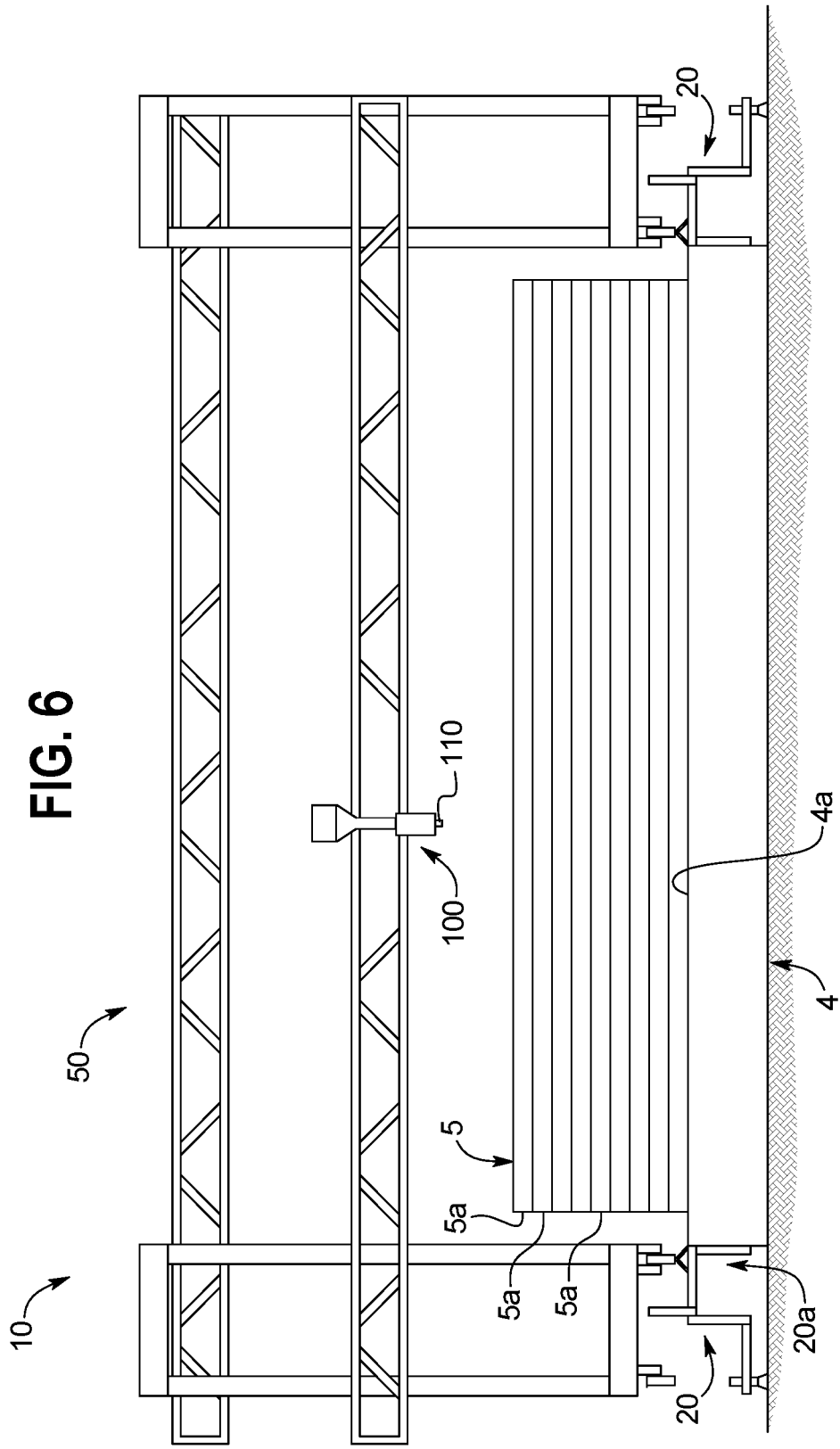
FIG. 6 is a system diagram of an exemplary 3D printing system for printing the 3D printable material, according to an example embodiment of the present disclosure.

An exemplary construction system 10 is shown in FIG. 6. In this embodiment, the construction system effectuates the construction of a wall structure by passing the rock processing system 100 above a surface and extruding molten material from the nozzle of the rock processing system 100. As the rock processing system 100 moves in three possible orthogonal axes, as well as angles therebetween, the nozzle emits extruded molten material onto the upper surface of the wall structure as it is being formed. The wall structure is formed layer-by-layer by laying down an elongated bead of printable material beginning with the first layer on ground or a pre-existing foundation. As each layer of elongated beads are laid down onto the foundation or onto a previous layer, a plurality of stacked elongated beads of extruded building material additively, and three dimensions, form a building structure. The printing assembly may shut off flow of extruded material in order to switch printable inks and/or nozzles printing printable inks.

Referring to FIG. 6, the construction system 10 generally includes a pair of rail assemblies 20, a gantry 50 movably disposed on rail assemblies 20, and the rock processing system 100 movably disposed on gantry 50. The construction system 10 is configured to form a structure 5 (such as for example a personal dwelling) via additive manufacturing, specifically 3D printing, on a foundation 4. In particular, construction system 10 (via rail assemblies 20 and gantry 50) is configured to controllably move or actuate printing assembly 150 relative to the foundation 4 along each of a plurality of orthogonal movement axes or directions 12, 14, 16 such that the rock processing system 100 may controllably deposit an extrudable building material in a plurality of vertically stacked layers 5*a* to form structure 5 on a preexisting foundation 4. The gantry can be moved on wheels to the appropriate position, and then stabilized on jacks that raise the vertical supports and wheels off ground. The gantry may be moved in the x direction, the printing assembly may be moved in the y direction, as well as vertically up and down in the z direction.

As used in this specification, including the claims, the term "and/or" is a conjunction that is either inclusive or exclusive. Accordingly, the term "and/or" either signifies the presence of two or more things in a group or signifies that one selection may be made from a group of alternatives.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

We claim:

1. A method for preparing a three-dimensional printing material, the method comprising:
grinding in situ igneous anorthosite rock, the igneous anorthosite rock being predominantly plagioclase feldspar, into an amount of aluminosilicate powder;
heating the amount of aluminosilicate powder to a temperature between approximately 1,100° C. and approximately 1,750° C.;
maintaining the aluminosilicate powder at a temperature between approximately 1,100° C. and approximately 1,750° C. between about one minute and approximately 45 minutes to form a molten aluminosilicate material;
extruding the molten aluminosilicate material through a nozzle to form an elongated bead of molten aluminosilicate material; and
cooling the molten aluminosilicate material to form a hardened aluminosilicate material to the hardened state at a rate of about 300° C. per minute for about two minutes.

2. The method of claim 1, wherein the aluminosilicate powder comprises feldspar.

3. The method of claim 1, wherein no further materials are added to the aluminosilicate powder or the molten aluminosilicate material prior to extruding.

4. The method of claim 1, wherein the cooling step comprises cooling the molten aluminosilicate material for at least 7.5 minutes to form a hardened aluminosilicate material.

5. The method of claim 4, wherein the hardened aluminosilicate material includes about 76.1% albite/anorthosite feldspar.

6. The method of claim 4, wherein the hardened aluminosilicate material includes approximately 2.4% calcite.

7. The method of claim 4, wherein the hardened aluminosilicate material has a compressive strength of about 20,222 psi.

8. The method of claim 1, further comprising the step of extruding molten aluminosilicate material through the nozzle to form a plurality of elongated beads stacked atop one another to form a structure.

9. A method for constructing a building structure, the method comprising:
grinding in situ igneous anorthosite rock, the igneous anorthosite rock being predominantly plagioclase feldspar, into an amount of aluminosilicate powder;
heating the amount of aluminosilicate material to a temperature between approximately 1,100° C. and approximately 1,750° C.;
maintaining the aluminosilicate powder at a temperature between approximately 1,100° C. and approximately 1,750° C. for approximately 45 minutes to form a molten aluminosilicate material;
moving a nozzle using a rock processing system along three orthogonal axes and in angles therebetween and extruding the molten aluminosilicate material through the nozzle onto a foundation or a previous layer to form a bead of molten aluminosilicate material;
cooling the molten aluminosilicate material to form a hardened aluminosilicate material to the hardened state at a rate of about 300° C. per minute for about two minutes; and
extruding additional molten aluminosilicate material through the nozzle to form additional beads of molten aluminosilicate material stacked vertically upward atop one another to form the building structure.

10. The method of claim 9, wherein each bead of molten aluminosilicate material is cooled for at least 7 minutes.

11. The method of claim 9, wherein the hardened aluminosilicate material has a porosity of between about 14% and about 15%.

12. The method of claim 9, wherein the hardened aluminosilicate material includes between about 50% and about 90% feldspar.

13. A method for preparing a three-dimensional printing material to build a structure comprising:
providing a system including:
a hopper;
a tubular member;
an auger powered by an auger motor; and
an electric reactor assembly;
wherein the system is mounted within a robotic motion platform;
grinding in situ igneous anorthosite rock, the igneous anorthosite rock being predominantly Labradorite, into an amount of aluminosilicate powder;
placing the amount of aluminosilicate powder into the hopper;
directing the aluminosilicate powder through the tubular member and into the electric reactor assembly via the auger;
heating the aluminosilicate powder in the electric reactor assembly to a temperature between approximately 1,100° C. and approximately 1,750° C. to form a molten aluminosilicate material;
maintaining the molten aluminosilicate material at the temperature between approximately 1,100° C. and approximately 1,750° C. for a minimum of 45 minutes;
extruding the molten aluminosilicate material from the system through a nozzle mounted on the robotic motion platform;
cooling the molten aluminosilicate material to form a hardened aluminosilicate material to the hardened state at a rate of about 300° C. per minute for about two minutes; and
extruding additional molten aluminosilicate material through the nozzle to form additional beads of molten aluminosilicate material stacked atop one another to form the building structure.

* * * * *